United States Patent [19]

Marriott

[11] 3,919,314

[45] Nov. 11, 1975

[54] CHEMICAL PROCESS

[75] Inventor: Richard John Marriott, Manchester, England

[73] Assignee: Imperial Chemical Industries Limited, London, England

[22] Filed: Nov. 25, 1974

[21] Appl. No.: 526,922

[30] Foreign Application Priority Data
Nov. 27, 1973 United Kingdom............... 54898/73

[52] U.S. Cl............................................ 260/562 R
[51] Int. Cl.²....................................... C07C 103/44
[58] Field of Search ................................ 260/562 R

[56] References Cited
UNITED STATES PATENTS
3,281,467   10/1966   Wilson et al.................... 260/562 R FOREIGN PATENTS OR APPLICATIONS
1,139,506   11/1962   Germany........................ 260/562 R
1,277,241   9/1968    Germany........................ 260/562 R

*Primary Examiner*—C. Davis
*Attorney, Agent, or Firm*—Cushman, Darby & Cushman

[57] ABSTRACT

A process for the monoacylation of an aromatic primary diamine containing no sulphonic acid groups which comprises reacting an aliphatic acid anhydride in aqueous medium with a mineral acid salt of the diamine.

2 Claims, No Drawings

CHEMICAL PROCESS

This invention relates to a chemical process and more particularly to a process for the monoacylation of aromatic diamines.

Monoacylated derivatives of aromatic primary diamines are known compounds but are manufactured by somewhat inconvenient methods except where the presence of sulphonic acid groups produces suitable steric effects. Thus, m-aminoacetanilide is made by the acetylation of m-nitroaniline followed by reduction and p-aminoacetanilide is made by the nitration of acetanilide followed by reduction. It has now been found that monoacylated derivatives of aromatic primary diamines containing no sulphonic acid groups can be prepared in high yield by the direct acylation of the diamine.

Thus, according to the present invention, there is provided a process for the monoacylation of an aromatic primary diamine containing no sulphonic acid groups which comprises reacting an aliphatic acid anhydride in aqueous medium with a mineral acid salt of the diamine.

Diamines which may be acylated by the process of the invention contain no sulphonic acid groups but other substituents may be present on the aromatic nucleus for example lower alkyl and lower alkoxy groups and halogen atoms. The process is particularly suitable for the acylation of meta- and para-diamines and especially m-phenylene diamine and p-phenylene diamine.

Aliphatic acid anhydrides which may be used in the process of the invention include acetic anhydride and propionic anhydride. In order to obtain a high yield of monoacylated derivative the anhydride should be used in an amount of at least one mole per mole of diamine.

Mineral acids which may be used in the process of the invention include hydrochloric acid. For maximum yield of product a suitable amount of acid is approximately 2–2.5 equivalents per mole of diamine.

The temperature of the reaction mixture is preferably held below 20°C.

The invention is illustrated but not limited by the following Examples in which all parts and percentages are by weight.

EXAMPLE 1

108 parts of m-phenylene diamine (1 mole) are added to a mixture of 203 parts of 36% hydrochloric acid (2 moles) and 800 parts of water and cooled to below 15°C. 204 parts of acetic anhydride (2 moles) are added over 4–6 hours keeping the temperature below 15°C by cooling. The mixture is then stirred for 1 hour and salt is added to precipitate the hydrochloride which is collected by filtration.

The yield is 92% of theoretical for the monoacetylated diamine which contains less than 2% of the diacetylated compound and ½% of unchanged diamine.

A similar result is obtained when the m-phenylene diamine is replaced by p-phenylene diamine.

EXAMPLE 2

108 parts of 1,4-phenylene diamine (1 mole) are added to an agitated mixture of 205 parts of 36% hydrochloric acid (2 moles) and 800 parts of water and cooled to below 10°C. 127.5 parts of acetic anhydride (1.25 moles) are added over 4–6 hours keeping the temperature at 5°–10°C by cooling. The mixture is then stirred for 1 hour and salt is added to precipitate the hydrochloride which is collected by filtration.

The yield is 92% of theoretical for the monoacylated diamine which contains less than 1% of the diacetylated compound and ½% of unchanged diamine.

EXAMPLE 3

108 parts of 1,2-phenylene diamine (1 mole) are added to an agitated mixture of 205 parts of 36% hydrochloric acid (2 moles) and 800 parts of water and cooled to below 15°C. 150 parts of acetic anhydride (1.47 moles) are added over 4–6 hours keeping the temperature at 5°–15°C. by cooling. The mixture is then stirred for 1 hour and salt is added to precipitate the hydrochloride which is collected by filtration.

The yield is 39.5% of theoretical for the monoacylated diamine.

EXAMPLE 4

122 parts of 2,4-tolylene diamine (1 mole) are added to an agitated mixture of 205 parts of 36% hydrochloric acid (2 moles) and 800 parts of water and cooled to below 15°C. 204 parts of acetic anhydride (2 moles) are added over 4–6 hours keeping the temperature at 5°–15°C. by cooling. The mixture is stirred for 1 hour and salt is added to precipitate the hydrochloride which is collected by filtration.

The yield is 75% of theoretical for the monoacylated diamine, which is a mixture of the 2-amino (predominantly) and the 4-amino compounds.

EXAMPLE 5

108 parts of 1,3-phenylene diamine (1 mole) are added to an agitated mixture of 250 parts of 36% hydrochloric acid (2.5 moles) and 800 parts of water and cooled to below 5°C. 252 parts of propionic anhydride (1.94 moles) are added over 4–6 hours keeping the temperature between −5° and +5°C by cooling. The mixture is then stirred for 1 hour and salt is added to precipitate the hydrochloride which is collected by filtration.

The yield is 82% of theoretical for the monoacylated diamine.

EXAMPLE 6

138 parts of 2,4-diaminoanisole (1 mole) are added to an agitated mixture of 205 parts of 36% hydrochloric acid (2 moles) and 800 parts of water and cooled to below 10°C. 250 parts of acetic anhydride (2.45 moles) are added over 4–6 hours keeping the temperature at 0°–10°C by cooling. The mixture is then stirred for 1 hour and salt is added to precipitate the hydrochloride which is collected by filtration.

The yield is 80% of theoretical for the monoacylated diamine which is a mixture of the two possible isomers.

EXAMPLE 7

142.5 parts of 1-chloro-2,4-diaminobenzene (1 mole) are added to an agitated mixture of 205 parts of 36% hydrochloric acid (2 moles) and 800 parts of water and cooled to below 15°C. 200 parts of acetic anhydride (1.96 moles) are added over 4–6 hours keeping the temperature 5°–15°C. by cooling. The mixture is then stirred for 1 hour and salt is added to precipitate the hydrochloride which is collected by filtration.

The isolated yield is 69% of theoretical for the monoacylated diamine which is a mixture of isomers.

EXAMPLE 8

108 parts of 1,4-phenylene diamine (1 mole) are added to an agitated mixture of 255 parts 36% hydrochloric acid (2.5 moles), 800 parts of water and cooled to below 10°C. 220 parts of propionic anhydride (1.69 moles) are added to the above mixture over 4–6 hours, keeping the temperature in the range 0°–10°C by cooling.

The reaction mass is stirred for 1 hour at under 10°C, salted to a salt concentration of 20% to precipitate the hydrochloride which is collected by filtration.

I claim:

1. A process for the monoacylation of an aromatic primary diamine having the formula:

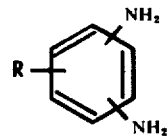

wherein R represents hydrogen, halogen, lower alkyl or lower alkoxy which comprises reacting a mineral acid salt of the diamine with acetic anhydride or propionic anhydride in aqueous medium.

2. A process as claimed in claim 1 wherein the diamine is a meta- or para-diamine.

* * * * *